Sept. 17, 1935.　　　M. A. ANGELO　　　2,014,608
MEAT GRINDER
Filed April 16, 1934
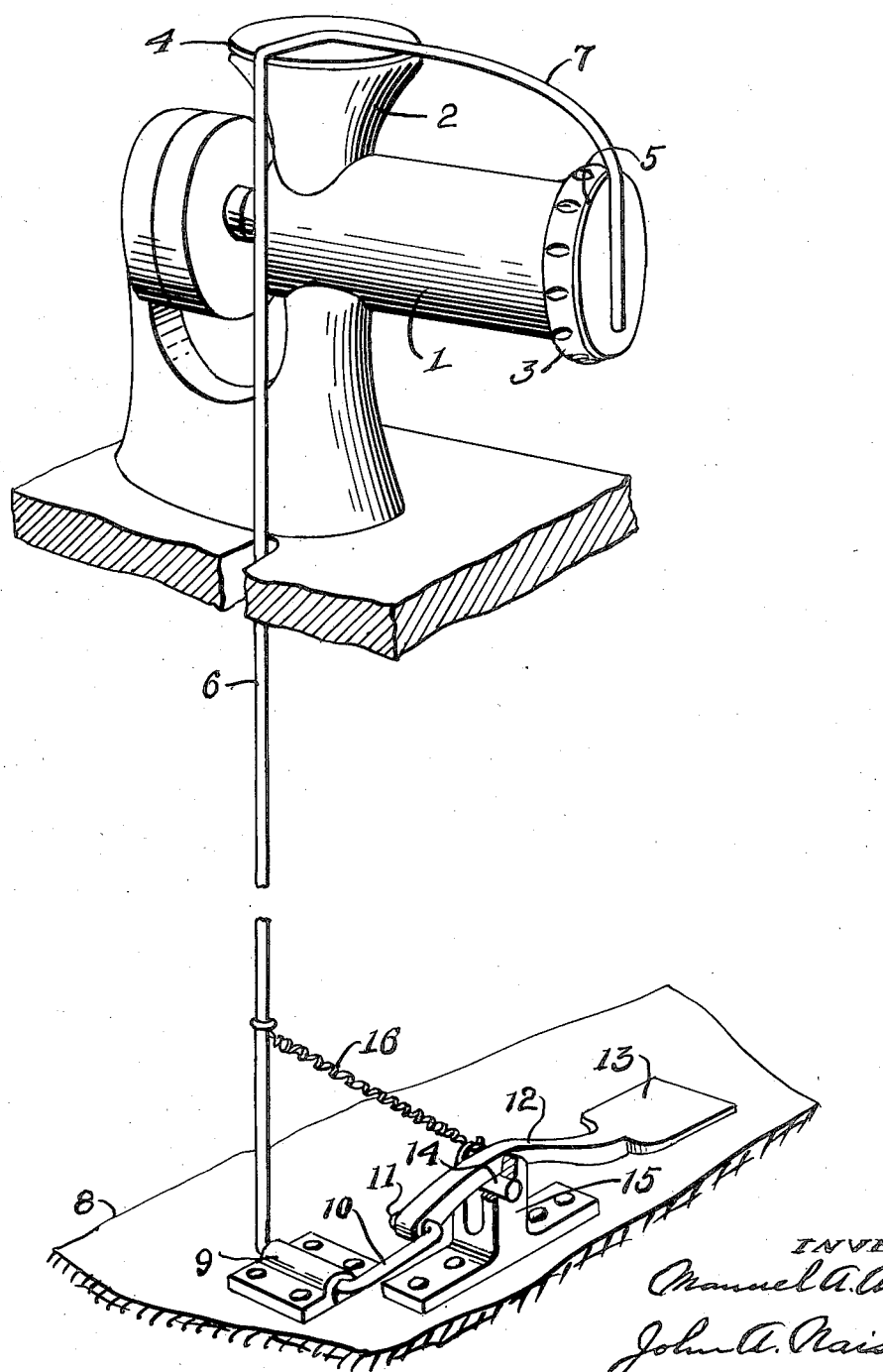

Patented Sept. 17, 1935

2,014,608

UNITED STATES PATENT OFFICE 2,014,608

MEAT GRINDER

Manuel A. Angelo, Santa Clara, Calif.

Application April 16, 1934, Serial No. 720,793

1 Claim. (Cl. 146—182)

The usual form of meat grinder such as is commonly used in meat markets is a stationary machine provided with an open topped hopper and an open ended portion through which the ground meat is discharged. It is obvious that even when such a machine is thoroughly washed and cleaned, if it is allowed to stand for any period of time both the hopper and the discharge openings will become coated with polluted and disease carrying dust that is carried into the meat when the machine is next used.

When the machine is allowed to stand after being used, which is common practice in the business, conditions are still worse. The grease and particles of the meat adhering to the machine quickly deteriorate in the warm and usually humid air and provides a ready culture for disease germs and harmful bacteria.

It is the object of the present invention to provide means for preventing the entrance of dust and other foreign material into the machine when not in use.

It is also an object to provide a means of the character indicated that will be economical to manufacture, simple in form and construction, simply and easily operated, and highly efficient in its practical application.

The drawing is a perspective illustration showing a device embodying my invention operatively positioned relative to a meat grinder, partly broken away.

Referring now more particularly to the drawing, I show at 1 a power operated meat grinder having a hopper at 2 and a discharge end at 3.

In carrying out my invention I provide two plates or covers of suitable size to effectually cover the said hopper and discharge end as shown at 4 and 5 respectively.

These two covers are fixedly mounted upon an operating arm 6, the said arm being formed as at 7 to support the two covers in fixed relation to each other. In the present instance the arm extends downwardly to the floor 8 where it is bent at right angles to engage a bearing 9. The part extending beyond the bearing is again bent at right angles to lie in a plane perpendicular to the arm proper as shown at 10 and terminates in a part 11 upon which a foot lever 12 is pivoted.

The lever 12 is provided with a pedal 13 and is fulcrumed upon a member 14 carried by a bracket 15 mounted on floor 8.

A spring 16 is connected to the arm 6 and to the bracket 15 to normally hold the arm 6 in a vertical position.

The covers 4 and 5 are preferably flat discs without flanges or projections of any kind so they may slide easily over the grinder openings.

When the device is constructed and mounted as above set forth the covers 4 and 5 normally fit snugly over the hopper and the discharge end of the grinder, and consequently these openings are effectually protected against the entrance of dust or any other foreign matter when the grinder is not in use. When the grinder is to be used, however, it is only necessary for the operator to step upon the pedal 13 whereupon the arm 6 is swung about its pivotal point at 9 and the covers are swung clear of the grinder and the openings are left unobstructed and ready for use.

It is to be understood, of course, that while I have herein shown and described but one specific embodiment of the invention, changes in form, construction, and method of assembly and operation may be made within the scope of the appended claim.

I claim:

A device of the character described comprising, the combination with a food grinder having a horizontally disposed feed opening and a vertically disposed discharge opening, of a pair of covers normally disposed to close said openings, a single arm secured to the vertical cover and extending over and secured to the horizontal cover and thence downwardly, a pivotal mounting for said arm, foot actuated means for imparting a pivotal movement to said arm whereby to move said covers to uncover said openings, and means for returning said covers to their normal closed positions.

MANUEL A. ANGELO.